United States Patent
Wieczorek et al.

(10) Patent No.: US 10,402,308 B2
(45) Date of Patent: Sep. 3, 2019

(54) SANDBOXING FOR CUSTOM LOGIC

(71) Applicant: SAP SE, Walldorf (DE)

(72) Inventors: Thomas Wieczorek, Meckesheim (DE); Thomas Schneider, Heidelberg (DE); Thomas Bollmeier, Heidelberg (DE); Michael Kappert, Graben-Neudorf (DE); Bernhard Then, Rauenberg (DE); Lu Zhao, Walldorf (DE); Sandro Schiefner, Hockenheim (DE)

(73) Assignee: SAP SE, Walldorf (DE)

( * ) Notice: Subject to any disclaimer, the term of this patent is extended or adjusted under 35 U.S.C. 154(b) by 433 days.

(21) Appl. No.: 14/963,809

(22) Filed: Dec. 9, 2015

(65) Prior Publication Data

US 2017/0168918 A1 Jun. 15, 2017

(51) Int. Cl.
*G06F 11/36* (2006.01)
*H04L 29/08* (2006.01)

(52) U.S. Cl.
CPC .......... *G06F 11/3664* (2013.01); *H04L 67/10* (2013.01)

(58) Field of Classification Search
CPC .............................. G06F 11/3664; H04L 67/10
USPC ......................................................... 717/125
See application file for complete search history.

(56) References Cited

U.S. PATENT DOCUMENTS

| | | | |
|---|---|---|---|
| 8,225,310 B1* | 7/2012 | Robertson | G06F 8/65 717/168 |
| 8,954,583 B1* | 2/2015 | Zhou | H04L 67/42 709/224 |
| 2002/0049926 A1* | 4/2002 | Korenshtein | G06F 9/4443 714/16 |
| 2004/0177093 A1* | 9/2004 | Mullins | G06F 17/30607 |
| 2014/0055453 A1* | 2/2014 | Maxim | G06T 15/00 345/419 |
| 2014/0282036 A1* | 9/2014 | Shottan | G06F 3/0484 715/738 |
| 2015/0142748 A1* | 5/2015 | Gottemukkula | G06F 11/1451 707/649 |
| 2015/0347448 A1* | 12/2015 | Kuo | G06F 17/30174 707/634 |
| 2017/0124340 A1* | 5/2017 | Chiu | G06F 21/606 |

OTHER PUBLICATIONS

"SAP S/4HANA: Extensibility for Customer and Partners (SAP White Paper)", (Jun. 2015), 32 pgs.

* cited by examiner

*Primary Examiner* — Emerson C Puente
*Assistant Examiner* — Sen Thong Chen
(74) *Attorney, Agent, or Firm* — Schwegman Lundberg & Woessner, P.A.

(57) ABSTRACT

A method of extending the functionality of an enterprise software suite is disclosed. A request is received from a client system to modify a programming object on a productive system deployed in the cloud environment. A logical unit of programming objects is identified on the productive system, the logical unit including the programming object. Copies of each of the programming objects in the logical unit of programming objects are created in a sandbox of a combined development and test system deployed in the cloud environment, the copies including a copy of the programming object. The copy of the programming object is modified in the sandbox. A result of the modifying of the copy of the programming object in the sandbox is communicated for presentation in a client system without modifying the programming object on the productive system.

17 Claims, 6 Drawing Sheets

*FIG. 5*

SANDBOXING FOR CUSTOM LOGIC

TECHNICAL FIELD

The present disclosure generally relates to tools and infrastructure for extending functionality of standard enterprise software applications and, in one specific example, to implementing a sandbox in conjunction with a test and development system and a development landscape service hosted in a cloud environment to support development and testing of extensions before deployment of the extensions on a productive system.

BACKGROUND

Extensibility may cover a broad spectrum of topics that relate to allowing customers of a provider of enterprise software to adapt the standard enterprise software to their needs. By making it easier for clients to implement extensions of the provider's enterprise software, the provider may benefit in various ways, including keeping current customers satisfied and attracting new customers.

BRIEF DESCRIPTION OF THE DRAWINGS

FIG. 5 is a block diagram depicting an example user interface that may be presented on a client device.

DETAILED DESCRIPTION

Figure 1:
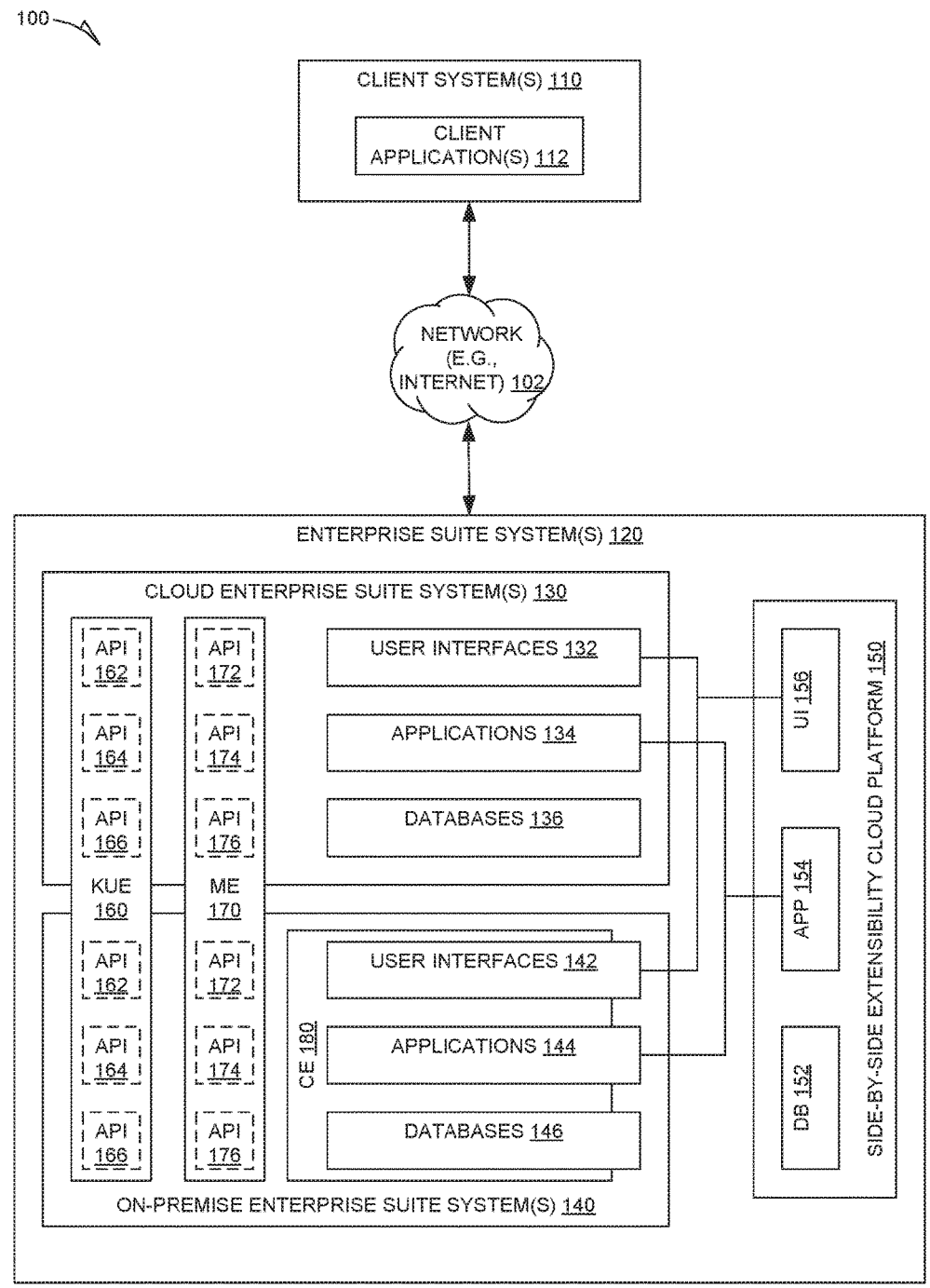
FIG. 1 is a network diagram depicting a system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

Extensibility in some enterprise software suites, such as the SAP® S/4HANA suite, can be categorized into two main parts: side-by-side extensibility (e.g., through a cloud platform, such as SAP HANA® Cloud Platform), and in-app extensibility (e.g., through built-in capabilities).

Customers using the side-by-side extensibility approach can build completely new UIs (e.g., based on a specific user experience, such as the SAP Fiori® user experience) or integrate with other cloud applications. They can also build completely new applications and business logic that natively run on an enterprise suite platform, such as the SAP HANA platform, or that are loosely coupled to a back-end programming language of the enterprise suite platform, such as the ABAP® programming language back end of the SAP HANA platform.

In various embodiments, the enterprise suite platform may feature both cloud and on-premise editions, each of which natively embodies key user in-app extensibility tools, offering the means to change and adapt the UI layout and context, create custom database fields and tables, create and extend analytical reports and forms, and change the business logic by adding business logic.

In various embodiments, for more granular and more powerful extensions, the enterprise platform may offer the customer means and processes to perform coded extensibility. This managed extensibility may allow the customer to transform parts of the custom coding (e.g., written in the back-end programming language) into the cloud while keeping the software lifecycle operation processes stable. The managed extensibility may be supported in the cloud platform by an additional service that allows customers to use development landscape hosted by the provider of the enterprise suite to develop add-ons that provide a very high level of in-app extensibility. In various embodiments, the rules and tools of the development landscape service may guarantee a clear logical separation of standard objects and objects developed by customers and partners.

In various embodiments, the on-premise edition of enterprise suite may provide full flexibility to the back-end programming language (e.g., ABAP through a development platform, such as Eclipse.

Enterprises that are customers of the provider of the enterprise suite may wish to achieve competitive advantage with optimized business processes. As such, they may rely on customer-specific extensions of their enterprise software included in the provider's software enterprise suite. With respect to the enterprise software, companies may intend to, for example, extend the functional scope (by adding custom-specific application logic, creating new business models, integrating other solutions, and so on) or extend the individual reach (by enabling access for more internal and external users, offering mobility solutions, and so on).

Both extension types may occur in parallel. For example, a call center solution with custom-specific application logic and UI may be built on top of a standard enterprise resource planning (ERP) system, thereby reaching out to a larger number of employees and subcontractors.

When implementing software extensions using a traditional approach, organizations may run large implementation projects with significant modifications to the standard enterprise software. At first, the high degree of flexibility may be regarded as a benefit. However, during subsequent phases of the lifecycle of the extensions, modifications may become pitfalls.

Since business experts usually do not implement extensions, interaction between the line of business (LoB) and IT may work like a waterfall model for large projects (e.g., no interconnected requirements determination and implementation phase) and thus increase time to value.

Large effort occurs for tests, validations, and adaptations necessary at every upgrade of the standard software to a new version (e.g., due to (mostly) hidden dependencies between standard and extensions).

The result may be slow implementation of requirements from the LoB and delay of adoption of innovations due to the upgrade effort mentioned above.

Extensions of software as a service (SaaS) may face even more challenges. For example, implementing and keeping cost optimization driven by highly scalable processes of data center operations.

Certainly, if extensions are completely forbidden, these challenges may not be present. However, an approach without any extensions would mean abandoning an important option to create competitive advantage in a specific area, which may be unacceptable for successful companies. In other words, enterprises typically need a balance between standardization and differentiation.

In various embodiments, as described herein, a customer can apply a tool-based and platform-based methodology that is scalable for companies ranging from small startups to large enterprises and that intrinsically avoids the drawbacks mentioned above. The extensibility options may include any of the following qualities.

End-to-end tools: Business users, experts, and implementation consultants can easily apply changes in their area of responsibility without risk.

Pace-layered IT: Custom extensions are loosely coupled with core business processes; that is, they need tight data, process, and UI integration, but the software lifecycle of extensions is decoupled from stable systems of records.

The ecosystem of partners of the enterprise suite provider: Customers get support to apply these principles and to implement differentiating solutions. In particular, partners often require a platform as a service (PaaS) for development, distribution, and maintenance of their solutions.

In various embodiments, a set of tools, platforms, and methodologies may serve the needs of customers and partners with the qualities outlined above. The main scenarios are outlined below.

Side-by-side extensions (e.g., based on an enterprise suite cloud platform): Customers and partners can learn from the outside and weave external content into their solutions. For example, SAP HANA Cloud Platform is the PaaS offering from SAP that offers broad end-to-end capability (e.g., from SAP HANA to SAP Fiori UX) and access to a broad set of data sources (e.g., from SAP cloud applications to social data). Using side-by-side extensions, customers or partners can integrate business processes with applications from third parties, such as SuccessFactors, Ariba, Concur, and so on. And they can use cloud platform services (e.g., cloud portal, mobile documents, and so on) for extended reach and scope. And they can enable different user experiences for existing solutions (e.g., an SAP Fiori and mobile user experience).

They can even build completely new solutions with a loose coupling to back-end systems. For example, the cloud platform services may be compliant with open standards (e.g., using open source software from Eclipse and Apache). When using the cloud platform services, customers will therefore benefit from a healthy ecosystem of partners that contribute value to existing solutions and services. In this scenario, customers may establish "best of breed" for small and large extensions. By definition, side-by-side extensions may be loosely coupled with core systems of the business suite provider and therefore support a pace-layered IT.

In various embodiments, in-app extensions are implemented in the same system (or software stack) as the enhanced application. In-app extensions may be implemented using classic extensibility or key user extensibility options.

Classic extensibility: Customers and partners can extend and even modify enterprise suite software with full access to development tools, such as Eclipse or ABAP Workbench (SE80). In various embodiments, this extensibility capability may only be available in the on-premise deployments of the enterprise suite software.

Key user extensibility: Customers usually apply many small changes and extensions (e.g., to increase user productivity or implement adaptations of the application logic) without changing the major parameters of the respective business processes. In other words, these extensions add value to enterprise suite applications and continue to rely on the full context of the standard implementations with respect to data, process, and UI levels. Frequent examples are adding custom database fields and tables or changing/adding business logic (rules, code snippets, and so on). In various embodiments, you can implement in-app extensions satisfying all extensibility qualities. In particular, end-to-end tools enable business experts to apply changes without risk, as the technical complexity is reduced to a level that corresponds to the business purpose and is stable and fault tolerant (e.g., similar to standard office applications). Thanks to a strict tool-based approach, these extensions are loosely coupled with core business processes and contribute to a pace-layered IT. In various embodiments, this scenario is applicable for both on-premise and cloud deployment of the enterprise suite software.

Managed extensibility: In addition to using the key user and side-by-side extensibility capabilities available in all cloud deployment models, customers and partners may have a strong need for coded extensibility of cloud deployments of the enterprise software from within the context of the application. These types of managed extensions have a focus on tight integration with the back-end, programming language-based, standard enterprise suite applications and thus are written in the back-end programming language (e.g., ABAB). To fulfill this requirement, the enterprise suite provider may offer customers and partners an additional service to use a provider-hosted development landscape to develop add-ons that allow a very high level of in-app extensibility, but with a restricted scope so that the operation of the add-ons do not break the cloud operations concept. For example, modifications of standard objects may be forbidden, and access to standard objects may be allowed only through released "whitelisted" application program interfaces (APIs) so that the custom and partner code will be lifecycle stable.

In various embodiments, a method of extending the functionality of an enterprise software suite is disclosed. A request is received from a client system to modify a programming object on a productive system deployed in the cloud environment. A logical unit of programming objects is identified on the productive system, the logical unit including the programming object. Copies of each of the programming objects in the logical unit of programming objects are created in a sandbox of a combined development and test system deployed in the cloud environment, the copies including a copy of the programming object. The copy of the programming object is modified in the sandbox. A result of the modifying of the copy of the programming object in the sandbox is communicated for presentation in a client system without modifying the programming object on the productive system.

This method and the various embodiments disclosed herein may be implemented as a computer system having one or more modules (e.g., hardware modules or software modules). This method and the various embodiments disclosed herein may be embodied as instructions stored on a machine-readable medium that, when executed by a processor, cause the processor to perform operations pertaining to the methods.

FIG. 1 is a network diagram depicting a system 100, within which various example embodiments may be deployed. The system 100 includes enterprise suite system(s) 120, including cloud enterprise suite system(s) 130 and on-premise enterprise suite system(s) 140. The enterprise suite system(s) 120 may include user interfaces 134 and 142, applications 134 and 144, and database 136 and 146 that together provide server-side functionality (e.g., via a network 102) to one or more client application(s) 112 executing on one or more client system(s) 110. Examples of the client system(s) 110 may include personal computers and mobile devices, including wearable computing devices. A mobile device may be any device that is portable or capable of being carried. Examples of mobile devices include a laptop computer, a tablet computer (e.g., an iPad), a mobile or smart phone (e.g., an iPhone), and so on. A wearable computing device may be any computing device that may be worn by a user. Examples of wearable computing devices include a smartwatch (e.g., a Pebble E-Paper Watch), an augmented reality head-mounted display (e.g., Google Glass), and so on. Such devices may use natural language recognition to support hands-free operation by a user.

In various embodiments, the client application(s) 112 may include a web browser (e.g., a browser, such as the Internet Explorer browser developed by Microsoft Corporation of Redmond, Wash.), a native application (e.g., an application supported by an operating system of the device (e.g., one of client machine(s) 110), such as Android, Windows, or iOS), or other application. Each of the one or more client machine(s) 110 may include a module (e.g., a plug-in, add-in, or macro) that adds a specific service or feature to a larger system. In various embodiments, the network 102 includes one or more of the Internet, a Wide Area Network (WAN), or a Local Area Network (LAN).

Although not shown in FIG. 1, the enterprise suite systems(s) 130 may include an API server or a web server configured to provide programmatic and web interfaces, respectively, to one or more application servers. The programmatic and web interfaces may include key user extensibility APIs 160, including the user interface APIs 162, including application APIs 164, and database APIs 166 for the cloud enterprise suite system(s) 130 and managed extensibility APIs 170, including user interface APIs 172, application APIs 174, and database APIs 176 for the on-premise enterprise suite system(s) 140, which are described in more detail below. Additionally, the enterprise suite system(s) 120 may include a side-by-side extensibility cloud platform 150 that implements application extensions 154 for the applications 134 and applications 144, user interface extensions 156 for the user interfaces 134 and 142, and database extensions 152 for the database 136 and 146, as described in more detail below.

The application servers may host the one or more user interfaces 134 and 142 and applications 134 and 144. Additionally, the application server may, in turn, be coupled to one or more data services or database servers that facilitate access to one or more databases, NoSQL or non-relational data stores. Such databases or data stores may include databases 136 and database 146.

The applications 134 and 144 may provide a number of functions and services to users who access the enterprise suite system(s) 120. While the applications 134 and 144 are shown in FIG. 1 to be included on the enterprise suite system(s) 120, in alternative embodiments, the applications 134 and 144 may form part of a service that is separate and distinct from the enterprise suite system(s) 120.

Further, while the system 100 shown in FIG. 1 employs a client-server architecture, various embodiments are, of course, not limited to such an architecture, and could equally well find application in a distributed or peer-to-peer architecture system, for example. The various applications could also be implemented as standalone software programs, which do not necessarily have computer networking capabilities. Additionally, although not shown in FIG. 1, it will be readily apparent to one skilled in the art that client machine(s) 110 and enterprise suite system(s) 120 may be coupled to multiple additional networked systems.

Figure 2:
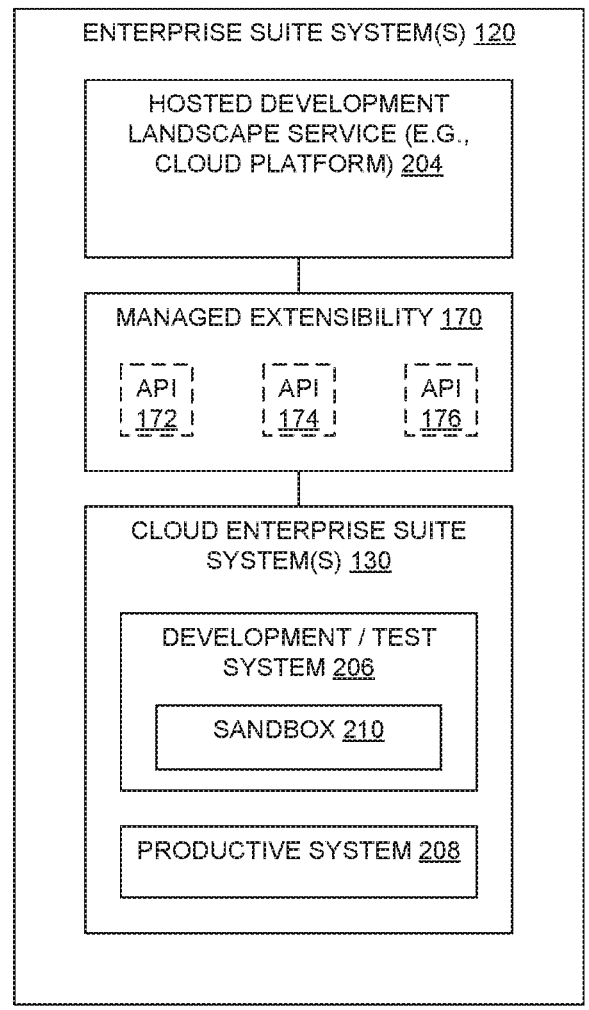
FIG. 2 is a block diagram depicting additional example components of the enterprise suite systems of FIG. 1.

FIG. 2 is a block diagram depicting additional example components of the enterprise suite system(s) 120. A hosted landscape development service 204 provides a hosted development platform for developing managed extensions to applications 134. The hosted development landscape service 204 includes one or more tools for developing programming objects that interface with core objects of the enterprise suite system(s) 120 via the managed extensibility APIs 170, including the user interface APIs 172, the application APIs 174, and the database APIs 176. The extensions are created and modified in a sandbox 210 that is hosted on a combined development/test system 206 that is separate from the productive system 208. Thus, the extensions can be created and modified as if they are executing on the live productive system 208, but they do not affect the productive system 208 until they are published to the productive system 208, as described in more detail below.

Together, in-app and side-by-side extensibility scenarios offer a successful methodology. Note that they are complementary approaches intended for different use cases and should be considered as enablers to generate competitive advantage in the market.

Customers may immediately benefit from both scenarios. They can extend their reach and beat the competition by creating a difference with optimized business processes, quicker time to value with faster innovation cycles, and higher flexibility. Partners also win when they use enterprise suite extensibility. They can build a compelling portfolio with the extended scope and reach of the enterprise suite. They achieve a high degree of flexibility through open standards and public APIs and benefit from flexible deployment options and investment protection for existing partner solutions. This is especially beneficial because the enterprise suite supports a smooth transition from on-premise to cloud computing deployments. Finally, partners can approach a large customer base, since almost all customers create custom-specific extensions.

In various embodiments, on cloud deployments, because access to standard objects is possible through public APIs only, some extensions written in a back-end programming language may have to be reimplemented, either with the "key user extensibility" or "managed extensibility" in-app extensibility capabilities or side-by-side (e.g., using the cloud platform services).

In the on-premise edition, customers can also use these capabilities, but they still have the freedom to create development objects using the classic development capabilities of the back-end programming language platform. The motivation for pushing extensions into key user extensibility, managed extensibility, or side-by-side on the cloud platform is the reduced cost of operations for the customer (e.g., the reduced cost of applying enterprise suite software updates).

Customers and partners that have analyzed their products and software components according to the above-listed categories and recommendations should also take the following extensibility options assessment into consideration.

The assessment is that, in general, the freedom/expressiveness, and the possibility to influence the internal process behavior of the enterprise suite, decreases from the on-premise edition, over the cloud enterprise edition, to the cloud edition. The scalability of the extensibility option increases from the on-premise edition, over the cloud enterprise edition, to the cloud edition.

Side-by-side extensions provide a maximum of freedom/ expressiveness and are not limited regarding integration with any enterprise suite deployment or in-app extensibility option. This is why side-by-side extensibility may be the default and option of choice for customers' and partners' enterprise suite extensions.

But the ability to influence the internal transactional process behavior of the enterprise suite is limited when using side-by-side extensions. This is why the provider may continue to provide a number of enterprise suite in-app extensibility options. These give customers and partners more choice to implement world-class solutions by extending the enterprise suite software.

Side-by-side extensibility with a PaaS approach based on SAP HANA Cloud Platform has benefits and may be recommended whenever customers and partners want to: integrate business processes with other cloud applications (for example, SuccessFactors, Ariba, and third-party applications), develop freestyle extension applications with a high degree of flexibility and using a rich set of services (for example, cloud portal or mobile documents), design and build mobile user experience (e.g., a SAP Fiori user experience) for existing solutions (on-premise or cloud) using a browser-based tool (e.g., SAP Web IDE), or benefit from a separate software lifecycle (pace-layered IT).

Business-related examples of utilizing the side-by-side benefits include: reaching out to external users and consumers (for example, customer service portal), enriching standard processes with before and after steps (for example, customer service), bridging applications between cloud and on premise, or developing new stand-alone cloud apps.

In various embodiments, the cloud platform may serve as the enterprise suite provider's in-memory platform-as-a-service offering. It may enable customers, partners, and developers to build, extend, and run next-generation applications in the cloud. It can be used for extensions of cloud and on-premise applications. With flexible subscription models and optional services for apps, database, and infrastructure, the cloud platform may provide instant access to the full power of the enterprise suite.

The provider's cloud platform may comprise infrastructure services (for example, cloud operations, data backup, compliance, and service-level agreements [SLAs]), database services (e.g., in-memory analytics, text search, planning, predictive and stored procedures), and application services (for example, cloud portal, security, document, administration, and development tools). Integration technology may also provide powerful integration services.

The cloud platform may be the default choice for building an extension for any cloud solution. Developers may use Java, HTML5, or native enterprise-suite extended application services combined with the underlying open API layer and powered by the enterprise suite. Application services for the cloud platform may include security services (e.g., authentication, identity federation, password storage, policies, single sign-on, and social sign-on services), portal services (e.g., launchpad for sites or user experience, theming and branding, role-based authorization, content-catalog for widgets, application integration, and templates services), documents services (e.g., storage, access control, versioning, repository and folder management, metadata, and encryption services), administration services (e.g., account management, members management, quota management application management, monitoring, and authorizations services), integration services (e.g., on-premise cloud connector, extract, transform, load (ETL), process integration, destination management services), mobile services (e.g., mobile application lifecycle, device-notification, discovery, offline data, settings exchange, or usage analysis services), or tools services (e.g., Eclipse plug-in, Web-IDE, software development kits, or marketplace services). All of the services may use database services, such as SAP HANA services. Additionally, all of the services may use infrastructure services that provide, for example, certified operations, advanced network security, ISLA compliance, data backup, compliance, integrity, confidentiality, and so on (e.g., SAP data centers).

In various embodiments, there are two main use cases in where the cloud platform may be used as an extension platform, as described below.

New and adopted user interfaces: Often, customers and partners need to do significant structural adaptations to provider-delivered user interfaces, such as SAP Fiori user interfaces, or they may even want to create completely new user interfaces on top of the released open APIs. Another important use case is custom- or partner-specific UI theming (e.g., using a UI theme designer). The cloud platform may provide the relevant environment and tools for these use cases.

Extension applications: In some cases, net-new business processes and scenarios cannot be addressed with in-app extensibility. Side-by-side extension applications are a means to allow the highest possible extension flexibility. In general, extension applications on the cloud platform consist of static resources and a connection to a back-end system using Representational State Transfer (REST)-based and Simple Object Access Protocol (SOAP)-based Web services (on premise and on demand). A UI development toolkit (e.g., for HTML5 (SAPUI5) and SAP Fiori apps) with a data connection to the back-end system in the cloud (e.g., an Open Data Protocol (OData) service exposed by the back-end system) are examples here. To use the full business functionality coming with the enterprise suite, selected traditional APIs such, as business application programming interfaces (BAPIs) and intermediate documents (IDocs), may be exposed as well. The set of available APIs may depend on enterprise suite deployment options and the activated scope.

In various embodiments, the general process of extending the enterprise software suite with extensions built on the cloud platform is as follows:

1. Rapidly build a modern and mobile UI (e.g., a SAP Fiori or HTML5-based UI) on the cloud platform based on the released enterprise suite services (and optionally through extended in-app capabilities);

2. (Optional) Enhance the solution with advanced mobile capabilities (e.g., cloud platform mobile services) or by providing them through a portal site (e.g., a cloud portal);

3. (Optional) Build new application logic on the cloud platform (e.g., legacy enterprise software extended application services, Java) using cloud platform application services;

4. (Optional) Integrate with other provider- and non-provider solutions through cloud integration services;

5. (Optional) Establish single sign-on and reuse users and roles from an existing identity provider;

6. Roll out the newly created or enhanced functionality to the users to any device anywhere.

In various embodiments, the cloud platform provides a set of design-time tools to support an efficient development process, including any of the following:

(1) A cloud platform cockpit. The cockpit may be a central Web front end for managing all activities associated with an account and for accessing key information about extension applications (e.g., HTML5, Java, and legacy enterprise suite extended application services).

(2) A web IDE (Integrated Development Environment). The web IDE may be a Web-based development tool designed to support the end-to-end lifecycle for applications having a variety of user interfaces, such as SAP Fiori and SAPUI5 applications. It may comprise prototyping, development, packaging, deployment, and customer extensions for the applications. It may provide standard web development tools such as code editors, wizards, project persistence, and WYSIWYG tooling that are optimized for building responsive applications (including, for example, code completion). The web IDE may be used in the enterprise suite as a development environment to extend applications (for example, to extend controllers, extend or replace views, replace services, add new views to existing projects, implement extension points) and also to build custom applications.

In various embodiments, this environment requires no additional installation and provides improved developer productivity by offering highly efficient development tools, end-to-end application lifecycle support, and support for mobile and tablets in one tool.

In various embodiments, an extension can either be implemented in the same system as the enhanced application (in-app extensibility), or it can be built on a separate extension platform (side-by-side extensibility). Both variants may be valid and have their use cases, which are reflected in the offerings of cloud vendors.

The benefits of in-app extensibility may include any of the following: better performance (no latency, no data transfer to a side-by-side system), direct utilization of enterprise suite features (for example, core data service views), and integration into application engines and logic, regardless of their layer, allowing use of the full business scope of these applications within extensions.

Business-related examples utilizing these benefits may include any of the following: any structural enhancements of business data and related reporting, variants of standard processes and business logic (for example, microvertical solutions and localization), and choreography with focus on enterprise suite data and processes.

As a major way to realize extensibility, key user extensibility enables business experts from LoBs, who have no deep technical knowledge, to implement the most important types of customer extensions. For this purpose, use-case-specific tools can be launched directly from the application UI—the natural working place of key users.

Any of the following use cases for enterprise suite extensibility may be realized with in-app extensibility for key users: field extensibility (e.g., custom fields), table extensibility (e.g., custom objects, node extensibility), business logic extensibility (e.g., code breakouts), UI extensibility (e.g., hide move, add fields, change labels), report extensibility (e.g., new reports), form extensibility (e.g., print forms and email templates), and key user transport capabilitise. These use cases can be implemented by business users, except for code-based behavioral extensibility.

Key user extensibility capabilities offered to customers must continue to work after an SAP software update without manual work. In other words, SAP software updates do not depend on adoptions by the customer or partner. Therefore, all extensibility scenarios depend on the availability of related released APIs or "anchor points" in the to-be-extended SAP application. The list of APIs or anchor points is a work in progress.

In various embodiments, in a UI adaptation mode (also called runtime authoring mode), a business user can adapt the UI layout in a modification-free way (e.g., hide fields in a form, table, or filter; rename labels; move form field or UI block; define new filter and table variants, and so on. This may apply, for example, to transactional UIs and fact sheets.

Additionally, more fields can be added to the UI layout. They can either be provider fields that are not yet part of the UI or custom-specific fields (described below).

Field extensibility refers to the capability to add customer-specific fields (e.g., custom fields) to a business context of an application (for example, a sales order item or a customer address) in a one-to-one relation.

Directly from the UI adaptation mode, a business user may launch the "add field" functionality. This guides the user into a simple dialogue, where the field properties can be edited or translated—like data type, label or code list values, and texts.

After the field has been defined, various software artifacts are generated by an extensibility tool: database tables and application structures are enhanced (e.g., by using the "DDIC extension include" concept). Assigned core data service (CDS) views, UI search, and OData services may be extended as well. As the applications are prepared for this kind of extensibility, they may consider these extension fields in their business logic (e.g., the generated fields can be used directly.

It may also be possible to find other artifacts that are related to the underlying extended business context (such as more UIs, reports, forms, external interfaces, processes, and enterprise search) and to add the previously defined custom field to these artifacts.

When several applications are part of the same business process, they can be extended together. Mapping of the custom fields in processes happens either automatically or can be defined by the business user through simple rules.

In various embodiments, there may be technical constraints for field extensibility. For example, making standard tables too broad might slow down the performance. Also, there may be a maximum width for tables on the database.

Table (or node) extensibility denotes the capability of adding customer-specific fields to a business context of an application (e.g., in a 1:1 or 1:n relation).

In contrast to field extensibility, new customer-specific tables may be created in the database. This may be accompanied by a set of API functionalities supporting create, read, update, delete (CRUD) services through API classes, CDS views, and OData services. Applications prepared for table extensibility may integrate the customer-specific table through these APIs in all relevant layers.

The feature of table extensibility in the enterprise suite may also include any of the following. (1) New (stand-alone) custom tables that are not child tables of provider (e.g., core) tables could be fed through a UI or data load from other customer systems. These stand-alone tables might be used as code lists, for process control, or as facts or dimensions for analytical purposes and several stand-alone custom tables may be bundled into a hierarchy, creating a new application with simple business logic. (2) Custom tables could be used to add fields to business contexts in a 1:n relation (for example, hobbies of a customer) or to resolve the technical constraints of field extensibility in case of extensions in a 1:1 relation. In this use case, the custom data may behave like the standard (e.g., provider) data (for example, the authorization inherited from the core object parent), and custom data is deleted when the parent is deleted. This use case requires that the enterprise suite applications are prepared for this kind of extensibility. Table extensions can be created directly in a key user UI as described above for field extensibility.

Beyond UI extensibility, which allows the adaptation of an application's appearance, and field or table extensibility, which allow the enhancement of the data structure of applications, a further important extensibility capability is required: enhancement of the behavior of applications and processes.

Prominent use cases for this capability include data validation, data calculation (for example, supplying default values), and mapping of standard and extension fields within applications and processes. To make processes more flexible, custom-specific checks might be offered (for example, on approval) or the possibility of removing process steps or defining additional ones. Additional examples of use cases are application domain-specific topics such as tax calculation or price determination.

Technically, business logic extensibility in the enterprise suite is realized by application-specific code exits, which can be implemented by customers.

As code exit technology (for example, Business Add-Ins, or BAdIs) may be a standard enhancement option for back-end applications, and since major parts of the enterprise suite core applications are implemented in the back-end programming language, customers and partners may be given the option to create enhancement implementations in a lightweight version of the back-end programming language (e.g., an "ABAP 4 Cloud.") It may be available for the cloud and on-premise editions of the enterprise suite platform.

Developers and experienced business users (including implementation partners) may be able to provide an implementation for exposed enhancement options in a simple and safe way using a web-based editor. In this web-based editor, enhancement options may be simple to discover (e.g., by UI, by business context, by purpose) and understand (e.g., self-explanatory field names, well documented, including code examples). This also implies that the implementation is clearly business related (for example, defining formulas in spreadsheet applications). The web-based editor may also include features such as syntax coloring, syntax check, code completion, element information, and integrated test support.

To ensure that the system stability needed for cloud operations is not hampered, the back-end programming language feature set may be reduced as part of the syntax check. For example, only expressions, control and flow statements, variables, and tables may be available. Furthermore, code-based enhancements may enable access to any of the following: inbound and outbound enhancement option parameters following a global CDS field name catalog; read access through Open SQL to public CDS views; calls to cloud-released APIs; calls to math or string libraries; and connectivity to the cloud platform through a cloud connector.

In various embodiments, the web-based editor can be used only to implement enhancement options within enterprise suite applications or for events and actions on custom tables, not to develop new applications.

Also for business logic extensibility, the business user should be able to realize as many use cases as possible. As business users are assumed to have a different view on code than enterprise software developers, a rule-based approach may be the method of choice. In various embodiments, the business rules framework BRF+ may be used to realize this capability. In other embodiments, rule-based extensibility may be integrated in the UI adaptation mode, as described for field extensibility, assisted by a simple dialog.

The cloud edition of the enterprise suite may provide end-user analytical flexibility. The relevant capabilities address the typical analytical uses cases, from simple lists to multidimensional reporting, pixel-perfect reporting, dashboards, and key performance indicator (KPI)-based reporting. Analytics may be embedded in the same technical stack as the application and into the business processes and may be enhanced directly from the application UI of the productive system without the need for IT experts. For that, specific enterprise suite applications may guide the user through the entire process, requiring only basic technical knowledge.

In various embodiments, the provider provides an initial set of extensible analytics content, which can be extended by customers. Also, new analytics content can be created. Any of the following capabilities may be supported.

1. Extensibility for Data Sources. Data sources may be implemented using open CDS views, turning raw data into reportable data by selecting only those fields from the underlying database tables that are needed. In addition, using filters and calculations, generally needed transformations of the data can be modeled, facilitating the later use of the data.

Business users at the customer may be able to create new data sources based on standard data sources by using them in joins, unions, and projections and creating additional restricted (filtered) key figures, calculated measures, and dimensions within existing data sources. Also, it may be possible to change existing data sources by adding or removing fields, calculations, or filters.

2. Extensibility for queries, the standard settings of report and KPIs. Based on a data source, a query, which is also implemented as a specific type of open CDS view, may allow further detailing of the list of fields needed for a certain report. Flexibility allows business users to create or change key figures, change field labels, and define filters and layout variants.

Closely related to this workflow, the provider may also support the business user in assigning or unassigning the query to specific roles or users. Thus, the end user can launch it in a generic multidimensional reporting application. As queries are also the basis for KPI reporting, the business user may find tools to create or change KPIs.

In particular, the business user may be able to create new KPIs or change existing ones and assign them to roles and users. Any of the following features may be supported: Select the key figure in the query that holds the numbers; set filters, define visualization options (display the KPI as a number or a chart on the tile); configure the comparison—for example, of actuals versus targets; define drill-down behavior (initial drill-down dimension, chart type for drill-down); changes done by the key user will affect all users of the queries, reports, or KPIs.

3. End users personalizing reports and KPIs. Changes done by the end user may be relevant only for this user. The end user may be able to: Personalize the layout—for example, sequence of columns, hidden and displayed columns—and save the personalization in a personal layout variant; personalize the data selection and save the personalization in a personal selection variant; add simple column-based calculations (+, −, *, /); or perform object-based navigation to other reports and fact sheets or transactions Similarly, for KPIs the end user may be able to: Change the chart type in the drill-down, define own filter settings for the KPI; or add a tile showing the result of the applied filter settings on the home page.

Print forms may be maintained through a separate designer tool (e.g., the Adobe LiveCycle Designer). They may be based on OData services, which might be extended in case of field or table extensions according to the user's choice. Checkmarking a print form assigned to an extended business context in the key user extensibility tool may make the extension field available in the field catalog of the corresponding form. A forward navigation to the corresponding editor may open the administration screen for form templates, which in turn may allow the designer tool to be launched.

In addition, a key user may be able to create new print forms that may be: Based on an existing data source (e.g., an existing OData service); Based on an extended data source service, using existing fields and associations from published CDS views; based on a new data source (e.g., a new OData service).

The same may apply for e-mail template extensibility, only these templates are not bound against OData services but against CDS views.

Especially for the cloud edition of the enterprise suite, the combination of key user in-app and side-by-side extensions covers a scalable and flexible extensibility approach. But there are several reasons why customers and partners may be heading for an extensibility option (e.g., managed extensibility) that provides some more flexibility:

1. Customers and partners often need to better influence enterprise suite applications and process behavior from the outside. This means the enterprise suite back-end (e.g., ABAB) stack sometimes needs to be influenced by external orchestrators, such as the cloud platform, through a usually small but necessary in-app extension. This may require more freedom/expressiveness than is possible with key user in-app extensibility.

2. Many enterprise suite extensions will combine customer or partner in-app extensions with customer or partner side-by-side extensions to enable a viable solution. Here's an example: An insight-to-action scenario combining a side-by-side-based calculation and forecasting with an in-app extension to read data and trigger actions in the enterprise suite based on the forecasts from the cloud platform.

3. Partner in-app add-ons should be offered as well for customers of the cloud edition. In some legacy systems, this goal may be reached only with a combination of classic in-app and side-by-side extensions under the above-mentioned limitations an on-premise edition deployment. Thus, there is a strong need for coded extensibility for a cloud deployment of the enterprise suite, in the context of the application with a focus on tight integration.

These types of managed extensions may focus on tight integration with the back-end enterprise suite standard applications and thus may written in the back-end programming language (e.g., ABAP).

To fulfill this requirement, the provider may offer customers and partners an additional service to use a provider-hosted development landscape to develop add-ons to the back-end applications that allow a very high level of in-app extensibility.

To scale in the cloud, however, it is important that these add-ons do not break the cloud operations concept. Therefore, the add-on code may be limited to following strict rules to be allowed for integration into cloud edition deployments. The most critical rules guarantee a clear logical separation of customer and partner enhancements and standard objects.

In various embodiments, modifications of core objects will be strictly forbidden, as they may lead to customer and partner individual processes that prevent standardization. Access to core objects may be allowed only through released whitelisted APIs so that the custom and partner code will be lifecycle stable and so that provider updates do not lead to the need to adapt custom and partner code, which may be vital for cloud operations.

Tools may be provided to support the development of new code and the adaptation of existing custom and partner code to help ensure that the required rules are respected. A gate check process at the provider will be established to sign off the add-on content and to help ensure that it can be taken over to the cloud landscape for productive usage.

For partner add-ons, there may be a qualification and certification process. The intent may be to ensure that the business architecture and UI paradigms, as well as aspects of the respective deployment options, are reflected in the partner solutions and therefore support the enterprise suite brand.

In the on-premise edition of enterprise suite, customers and partners may still have full access to classic extensibility using development tools, such as Eclipse or another tool (e.g., ABAP Workbench). Modifications to enterprise suite objects and the use of enterprise suite objects (besides "quarantined" objects) may be allowed. "Quarantined" means existing but deprecated and not directly accessible.

Thus, this extensibility option may combine a maximum of freedom and unlimited expressiveness with the possibility of influencing the enterprise suite's process behavior. But the scalability, especially with respect to cloud operations, may be limited. When modifications or the use of back-end programming objects that are not on the white list exist, the deployment of classic extensions may be limited to the on-premise edition.

In various embodiments, customers and partners will be able to build add-ons for the on-premise edition, with classic extensibility. But the use of managed extensibility capabilities may be a recommended option, even for the on-premise edition, such that customers and partners may benefit from its expected reduced total cost of ownership.

For API access to the cloud editions, the following restriction may apply: Only cloud-released APIs are accessible—an approach called whitelisting. This rule may apply to both in-app extensibility (for example, implementable code breakouts for business logic extensibility and APIs available for their custom implementations) and to API access from outside (for example, by side-by-side extensions or third-party systems based on the cloud platform).

It may be important to follow this whitelist approach to ensure the system's integrity (especially during upgrades), to decrease operation cost and incidents, and to speed up innovation delivery to customers.

The following types of APIs may be available for in-app extensions: BAdIs for code breakouts, back-end programming language (e.g., ABAB) classes, CDS views, and function modules such as BAPIs. The whitelisting approach may allow a distinction between general cloud usage (for example, to support custom code by means of managed extensibility) and API exposition to key user tools.

For access from outside (for example, for side-by-side extensions based on the cloud platform), the following types of APIs may be whitelisted: IDocs through SOAP; service-oriented architecture (SOA) services, created manually or generated from BAPIs or other stable remote function modules, manually created data source (e.g., OData) services (Note: in some embodiments, UI-oriented data source services may not be planned for whitelisting, as they may not have the needed stability due to their UI-related nature; instead custom data source services may be required to be built in the back-end programming language); data source services generated from stable APIs—for example, CDS views of virtual data models. In various embodiments, white-listed APIS may be released by the provider based on requests from customers and partners and delivered through patches (e.g., bi-weekly patches).

In various embodiments, an API provisioning process may allow customers and partners to request a public API from the provider, or where partners can provide a partner-specific API as a partner add-on.

In various embodiments, customer and partner extensions that are built by using key user or managed extensibility or with side-by-side extensibility are expected to run after each upgrade without customer or partner preupgrade activity. Customer and partner extensions that are built by using classic extensibility may have to be tested and may be adapted by the customer or partner on their own system of the on-premise edition.

Deployment of side-by-side extensions may be done either by the customer (for customer-specific extensions) or through a cloud operation center of the provider (e.g., for commercial partner extensions).

Each customer-specific, side-by-side extension may run as a cloud application in its own virtual machine on a customer's own cloud platform account. By using the cockpit, customers can see which of their cloud applications require support. An alternative scenario may be available for OEM partners that provide partner side-by-side extensions running in their own virtual machine on a partner's cloud platform account to which multiple customers are subscribed. By using the cockpit, partners can also see which of their cloud applications require support.

For business-critical applications, extensions are typically created and tested before the extension is active for all users in the production environment. Here we may distinguish between cloud editions and on-premise editions of the enterprise suite.

In a cloud environment, three core principles may be important for extensibility objects:

1. Extensibility capabilities offered to customers must continue to work after an SAP software update without manual work; this implies that provider software updates do not depend on adoptions by the customer;

2. Extensibility objects must never block an SAP software update; and

3. The transport of extensibility objects from the test to the production system is performed by the key user without interaction with the service provider and outside of the maintenance window of the service provider.

In various embodiments, to support these core principles, the custom artifacts must comply with the following principles:

1. Custom artifacts must be technically modification free; they may be created as an own object that refers to the base object;

2. Custom artifacts must be technically clash free. Extensions must not clash with parts of the core objects that are added later on. Further on, extensions of different extending parties must not clash. This requirement may fulfilled by applying a unique namespace that is considered in every layer of the architecture. To support extensions of different extending parties (partners, customers), namespaces may require a "layering."

3. Custom artifacts use released, stable provider extension points and APIs only. This may be enforced by checks on the customer side. On the provider side, checks may prevent incompatible changes to objects that are marked as extensible and have been delivered once. A convenient deprecation mechanism may be available.

4. To avoid interference, separate transport channels for provider software updates and custom transports may be required.

In various embodiments, in the cloud edition, the lifecycle management may work as follows. In the test environment, a key user performs a key user change in a "sandbox environment." On "publish," the changes are activated for other users (all or only selected; this depends on roles). After testing (may be in combination with other changes), the key user can transport the changes to the production environment.

The transport application UI that is provided to the key user may be "in key user language." The key user can pick custom artifacts for transport that he or she knows of (no "technical" artifacts), and corresponding transport logs and error notification may add meaningful information. If technical errors occur, they result in an incident for the service provider. The transport channel for transports of extensions may be separated from the transport channels for provider software updates to avoid interference between transports.

In the on-premise environment, customers may have much greater freedom for development and for setting up the system landscape and quality assurance processes. As a consequence, customers will manage provider updates and customer transport with "classic" transport tools (correction and transport system).

Many end-to-end solutions that run on customers' systems will be a combination of provider standard components enriched with different in-app and side-by-side extensibility options.

If a customer uses classic or managed in-app extensibility in combination with side-by-side extensibility, the customer's cloud platform development account may be required to be connected to the customer's development system. If the customer uses the cloud edition in combination with the cloud platform, cloud systems may be required to be colocated in the same data center to optimize smooth connectivity and authenticity between the cloud platform accounts and their connected development systems.

If a solution integrates key user extensibility with side-by-side extensibility, it may be required that the key user extension is transported on the cloud edition side from test to production system by the provider or by a customer key user (both using key user tools) independently from the side-by-side extension on the cloud platform.

The deployment (installation, update, and upgrade) of managed extensions integrated with a side-by-side extension may be a technically decoupled process, but it may also sometimes be organizationally decoupled as well. The side-by-side extensions on the cloud platform may be "transported" manually through deployment from a local PC to development, testing, and productive cloud platform accounts (e.g., using the Eclipse client software and the SDK for the platform).

In various embodiments, a means for customers and partners to perform an automatic synchronized transport and activation may be provided for this scenario. Deployment synchronization may be solved by operational means rather than an automatic implicit activation after deployment by an operations team. A purely technical managed extension deployment or technical side-by-side extension deployment may not automatically trigger activation. The business processes may not change after a purely technical deployment on both sides (neither managed extension nor side-by-side extension). The synchronized activation or going-live may be coordinated by a customer's key user after the successful technical deployment of both parts. To support this explicit activation and going-live scenario, the extension may provide an activation API (e.g., back-end calls to the cloud platform, or vice versa) to activate the code and to switch on the business process.

Figure 3:
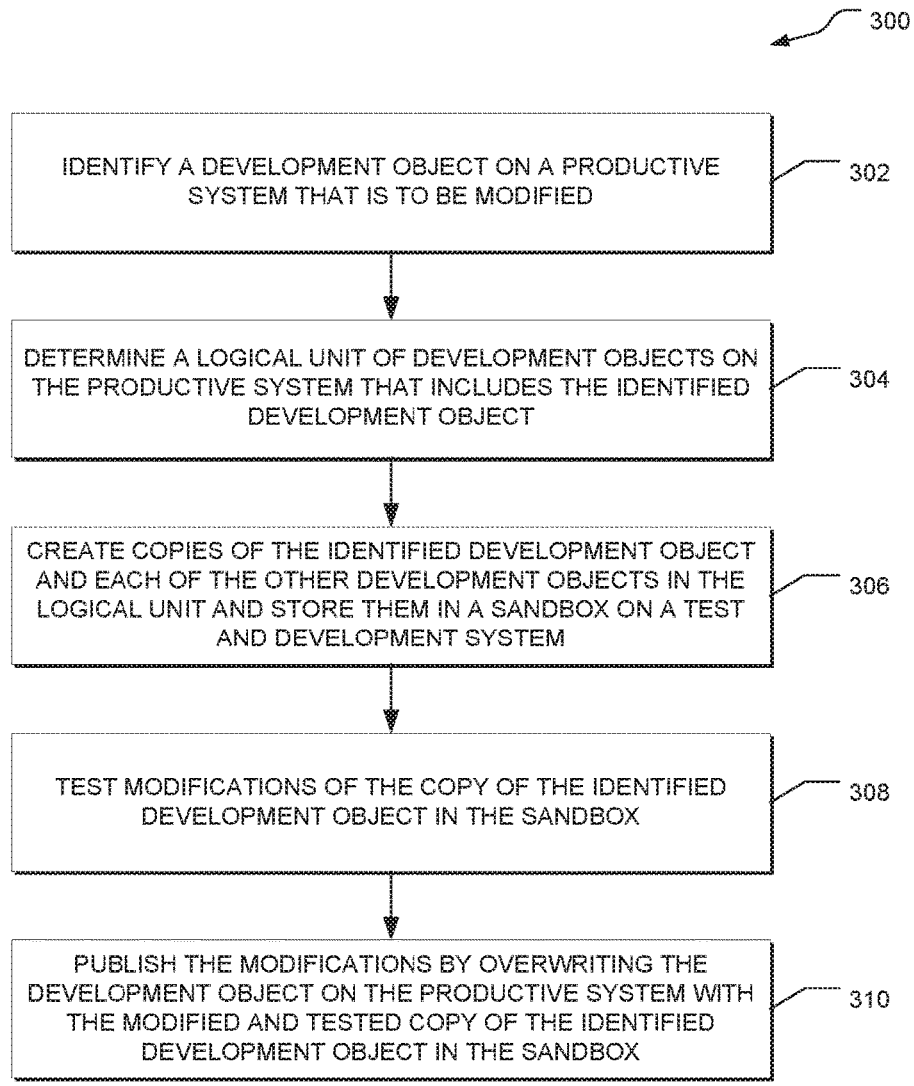
FIG. 3 is a flow chart of an example method of creating and modifying a development object of an extension of a standard enterprise suite application.

FIG. 3 is a flow chart of an example method of creating and modifying a development object of an extension of a standard enterprise suite application in accordance with the principles described herein. In various embodiments, this method may be implemented by tools executing on the cloud platform 204.

At operation 302, a development object that is to be modified is identified on a productive system. For example, a user of a programming tool executing on the cloud platform 204 selects an object for modifying.

At operation 304, a logical unit of development objects on the productive system corresponding to the programming object is identified. For example, the cloud platform 204 identifies a set of programming objects have only internal references.

At operation 306, copies of the objects in the logical unit are created and stored in the sandbox of a test and development system. Additionally, copies of the references of each of the objects are created such that none of the copies of the objects in the logical unit have references to objects outside of the logical unit that would require a change to the external object. However, references to objects within the logical unit from external objects are routed to both the original objects on the productive system as well as the programming objects in the sandbox.

At operation 308, modifications to the copy of the development object are simulated in the sandbox. For example, changes to objects that affect other objects in the logical unit are communicated for presentation on a client system such that the changes may be viewed in comparison to programming objects on the productive system. In various embodiments, the modifications are limited to modifications made via white-listed APIs, as described above.

At operation 310, the modifications to the object are published to the productive system. For example, the modified copied objects in the sandbox are used to overwrite the corresponding programming objects on the productive system. In various embodiments, the publishing is only allowed under the conditions specified above.

These methods and the various embodiments disclosed herein may be implemented as a computer system having one or more modules (e.g., hardware modules or software modules). These methods and the various embodiments disclosed herein may be embodied as instructions stored on a machine-readable medium that, when executed by a processor, cause the processor to perform operations pertaining to the methods.

Figure 4:
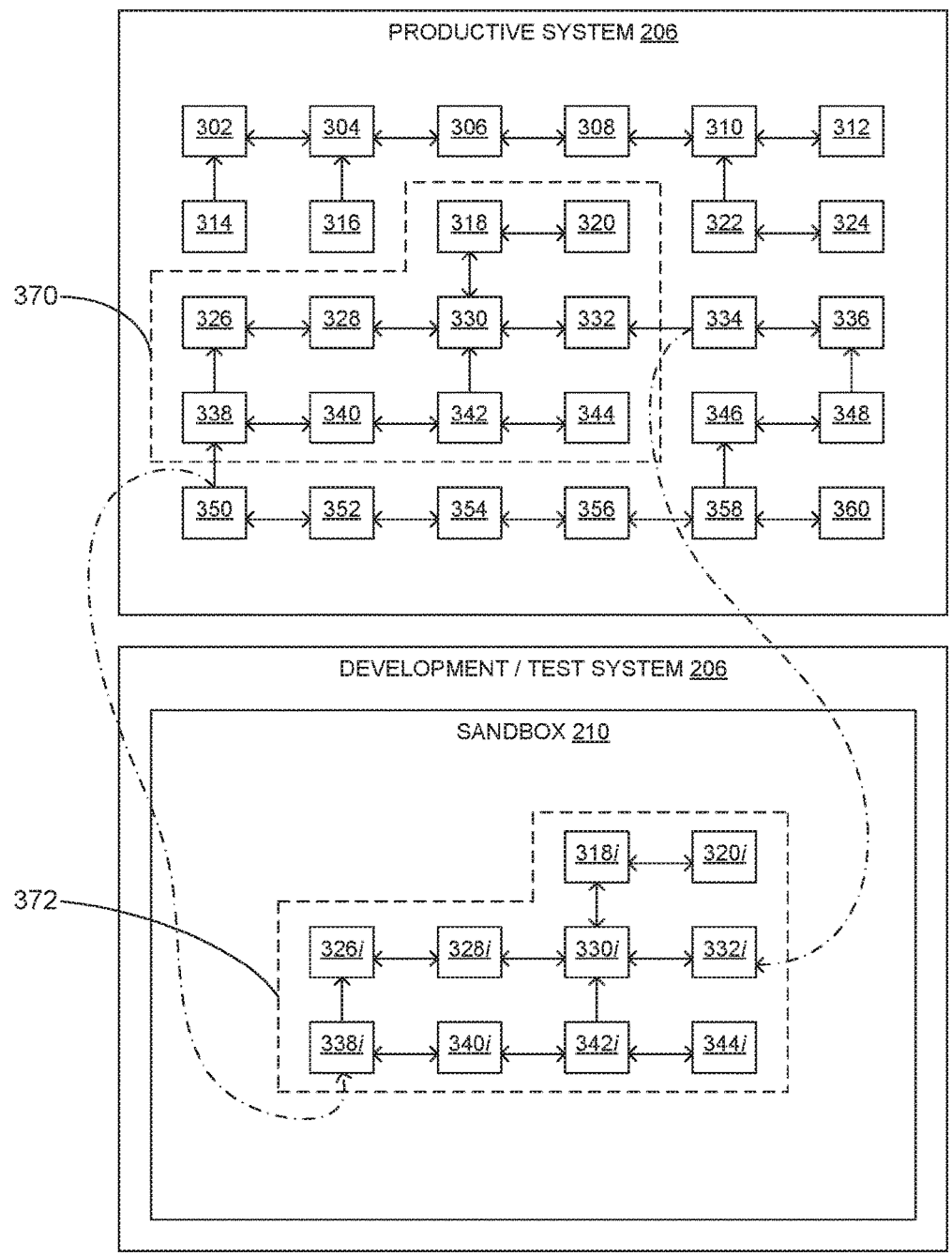
FIG. 4 is a block diagram depicting the copying of a logical unit of programming objects to the sandbox of FIG. 2.

FIG. 4 is a block diagram depicting the copying of a logical unit of programming objects to the sandbox. The programming objects 302-360 are executing on the productive system 206. The logical unit 370 is identified as programming objects 318, 320, 326, 328, 330, 332, 338, 340, 342, and 344. Copies of the programming objects in the logical unit 370 are created in the sandbox 210 and organized into a copy of the logical unit 372. The copied programming objects are 318i, 320i, 326i, 328i, 330i, 332i, 338i, 340i, 342i, and 344i. References to the objects from the productive system are allowed to flow in (e.g., the reference to object 332i from object 334 and the reference to object 338i from object 350). However, no references flow out from the logical unit 372; therefore, none of the programming objects on the productive system 206 are affected by any changes to the objects in logical unit 372. Changes to the objects in logical unit 372 may be communicated for presentation in a user interface of a client system. Thus, for example, a user of a client system may compare and contrast the objects in the sandbox (e.g., after one or more modifications have been applied) with the objects on the productive system using live data from the productive system.

Figure 5:
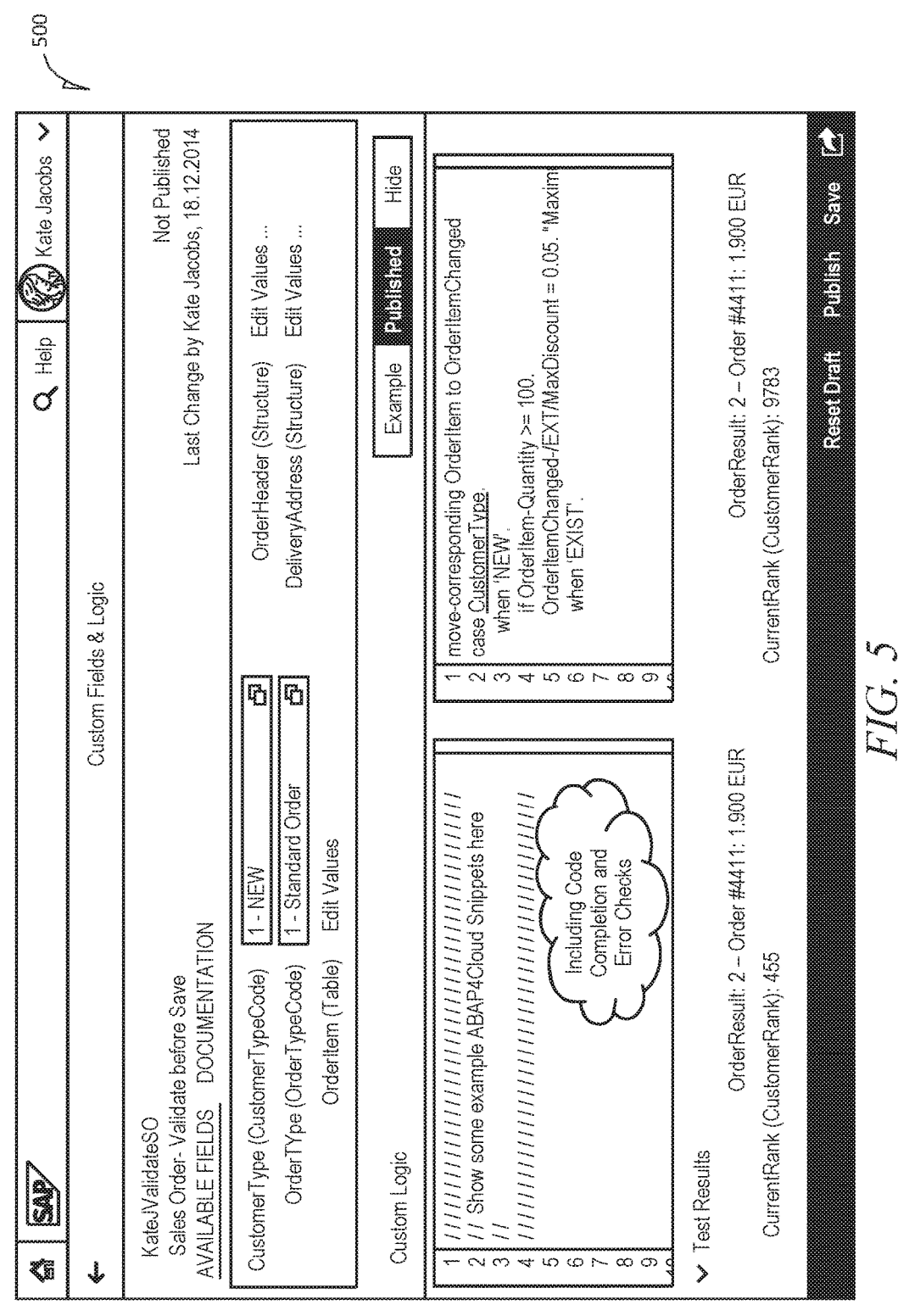

FIG. 5 is a block diagram of an example user interface 500 that may be presented on a client device. The user interface 500 includes a region for custom logic for a programming object that is in the sandbox. Thus, for example, a user may enter one or more changes (e.g., in a back-end programming language) to modify the object. The changes may then be analyzed with live data inputs from the productive system to determine how the changes affect other objects in the sandbox and to compare the objects in the sandbox with corresponding objects executing on the productive system.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 102) and via one or more appropriate interfaces (e.g., APIs).

Example embodiments may be implemented in digital electronic circuitry, or in computer hardware, firmware, software, or in combinations of them. Example embodiments may be implemented using a computer program product (e.g., a computer program tangibly embodied in an information carrier, in a machine-readable medium for execution by, or to control the operation of, data processing apparatus, such as, a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Figure 6:
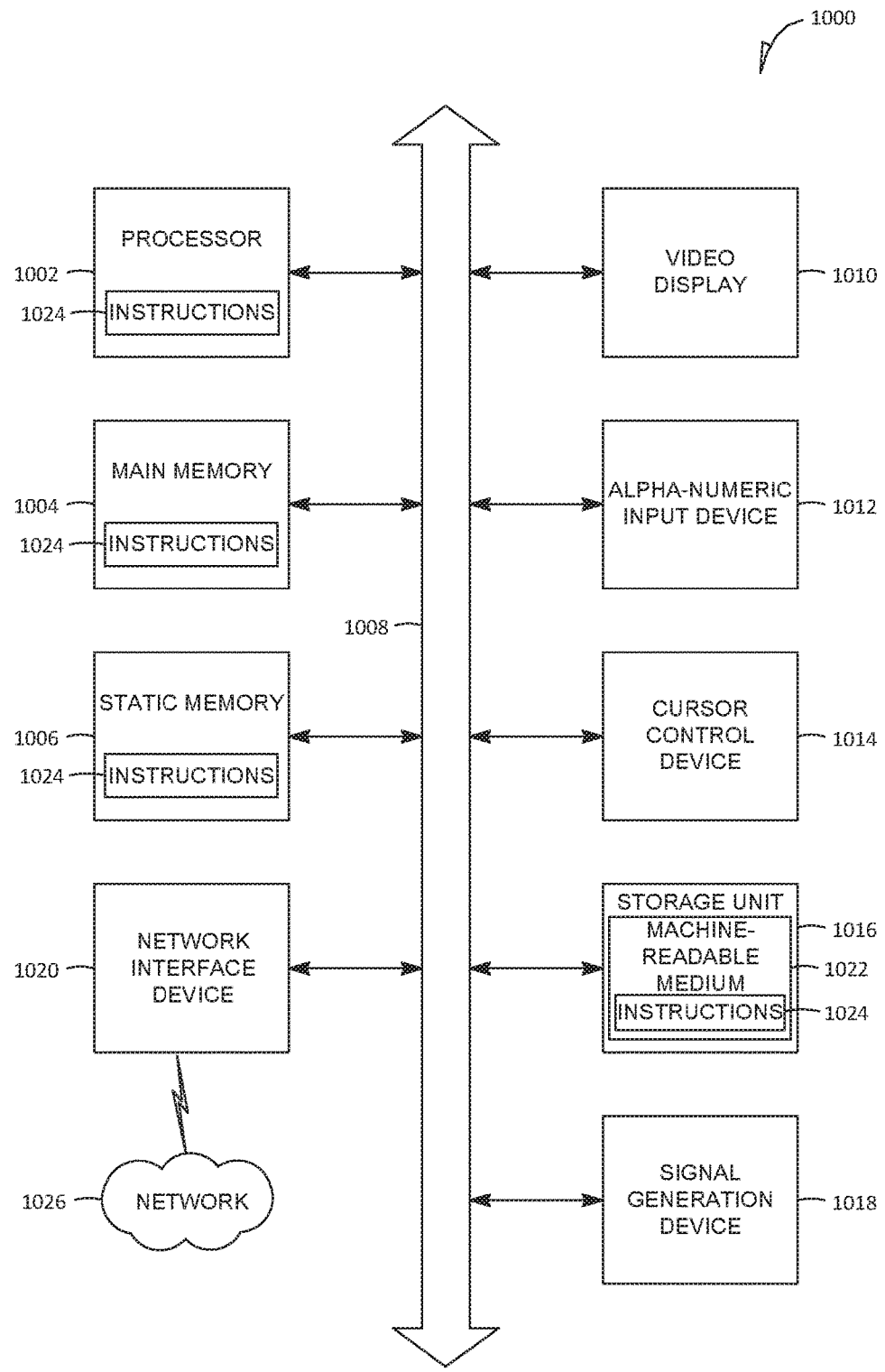
FIG. 6 is a block diagram of machine in the example form of a computer system within which instructions for causing the machine to perform any one or more of the operations or methodologies discussed herein may be executed.

FIG. 6 is a block diagram of machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit 1016 (e.g., a disk drive unit), a signal generation device 1018 (e.g., a speaker), and a network interface device 1020.

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1026 may be one of the networks 102.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more modules implemented by one or more computer processors of a hosted development landscape service of an enterprise suite system deployed in a cloud environment, the one or more modules configured to, at least:
   receive a request from a client system to modify a programming object on a productive system deployed in the cloud environment;
   identify a logical unit of programming objects on the productive system, the logical unit including the programming object, the identifying based on a determination that each of the programming objects in the logical unit of programming objects on the productive system would be affected by the modifying of the programming object;
   create copies of each of the programming objects in the logical unit of programming objects on the productive system, the copies including a copy of the programming object;
   store the copies of the programming objects in a sandbox of a combined development and test system deployed in the cloud environment;
   route references from programming objects outside of the logical unit to the copies of the programming objects in the sandbox in addition to the programming objects in the logical unit of programming objects;
   modify the copy of the programming object in the sandbox based on the request;
   communicate a result of the modifying of the copy of the programming object in the sandbox for presentation in a client system such that a user can view the result without modifying the programming object on the productive system.

2. The system of claim 1, wherein the presenting of the result includes using live input data received from other programming objects on the productive system.

3. The system of claim 1, wherein other programming objects outside of the logical unit would not be affected by the modifying of the programming object.

4. The system of claim 1, wherein each of the programming objects is an extension of a core programming object, the extension being implemented based on an application programming interface of the core programming object that is exposed by the hosted development landscape service.

5. The system of claim 4, wherein using the application program interface is the only way the extension can modify the core programming object.

6. The system of claim 4, wherein the extension is compatible with an enterprise suite system deployed in an on-premise environment to enable a feature of an application implemented in a side-by-side extensibility cloud platform.

7. A method comprising:
receiving a request from a client system to modify a programming object on a productive system deployed in the cloud environment;
identifying a logical unit of programming objects on the productive system, the logical unit including the programming object, the identifying based on a determination that each of the programming objects in the logical unit of programming objects on the productive system would be affected by the modifying of the programming object;
creating copies of each of the programming objects in the logical unit of programming objects on the productive system, the copies including a copy of the programming object;
storing the copies of the programming objects in a sandbox of a combined development and test system deployed in the cloud environment;
routing references from programming objects outside of the logical unit to the copies of the programming objects in the sandbox in addition to the programming objects in the logical unit of programming objects;
modifying the copy of the programming object in the sandbox based on the request;
communicating a result of the modifying of the copy of the programming object in the sandbox for presentation in a client system such that a user can view the result without modifying the programming object on the productive system.

8. The method of claim 7, wherein the presenting of the result includes using live input data received from other programming objects on the productive system.

9. The method of claim 7, wherein other programming objects outside of the logical unit would not be affected by the modifying of the programming object.

10. The method of claim 7, wherein each of the programming objects is an extension of a core programming object, the extension being implemented based on an application programming interface of the core programming object that is exposed by the hosted development landscape service.

11. The method of claim 10, wherein using the application program interface is the only way the extension can modify the core programming object.

12. The method of claim 10, wherein the extension is compatible with an enterprise suite system deployed in an on-premise environment to enable a feature of an application implemented in a side-by-side extensibility cloud platform.

13. A non-transitory machine readable storage medium storing a set of instructions that, when executed by at least one processor of a machine, cause the machine to perform operations comprising:
receiving a request from a client system to modify a programming object on a productive system deployed in the cloud environment;
identifying a logical unit of programming objects on the productive system, the logical unit including the programming object, the identifying based on a determination that each of the programming objects in the logical unit of programming objects on the productive system would be affected by the modifying of the programming object;
creating copies of each of the programming objects in the logical unit of programming objects on the productive system, the copies including a copy of the programming object;
storing the copies of the programming objects in a sandbox of a combined development and test system deployed in the cloud environment;
routing references from to programming objects outside of the logical unit to the copies of the programming objects in the sandbox in addition to the programming objects in the logical unit of programming objects;
modifying the copy of the programming object in the sandbox based on the request;
communicating a result of the modifying of the copy of the programming object in the sandbox for presentation in a client system such that a user can view the result without modifying the programming object on the productive system.

14. The non-transitory machine readable medium of claim 13, wherein the presenting of the result includes using live input data received from other programming objects on the productive system.

15. The non-transitory machine readable medium of claim 13, wherein other programming objects outside of the logical unit would not be affected by the modifying of the programming object.

16. The non-transitory machine readable medium of claim 13, wherein each of the programming objects is an extension of a core programming object, the extension being implemented based on an application programming interface of the core programming object that is exposed by the hosted development landscape service.

17. The non-transitory machine readable medium of claim 16, wherein using the application program interface is the only way the extension can modify the core programming object.

* * * * *